United States Patent
Cedeno

(10) Patent No.: US 8,733,637 B1
(45) Date of Patent: May 27, 2014

(54) MERCHANT GIFT CARD SYSTEM AND METHOD

(76) Inventor: Neville Cedeno, West Palm Beach, FL (US)

( * ) Notice: Subject to any disclaimer, the term of this patent is extended or adjusted under 35 U.S.C. 154(b) by 0 days.

(21) Appl. No.: 12/892,876

(22) Filed: Sep. 28, 2010

Related U.S. Application Data

(60) Provisional application No. 61/246,798, filed on Sep. 29, 2009.

(51) Int. Cl.
*G06K 5/00* (2006.01)

(52) U.S. Cl.
USPC .......................................................... 235/380

(58) Field of Classification Search
USPC .......................................... 235/380; 705/14.1
See application file for complete search history.

(56) References Cited

U.S. PATENT DOCUMENTS

| | | | |
|---|---|---|---|
| 2002/0049669 A1 | 4/2002 | Bleser et al. | |
| 2005/0228717 A1* | 10/2005 | Gusler et al. | 705/14 |
| 2006/0207856 A1 | 9/2006 | Dean et al. | |
| 2006/0224454 A1* | 10/2006 | Kantor et al. | 705/14 |
| 2007/0187494 A1 | 8/2007 | Hanna | |
| 2007/0205269 A1 | 9/2007 | Lindon | |
| 2007/0276753 A1 | 11/2007 | Bleser et al. | |
| 2008/0162299 A1 | 7/2008 | Gusler et al. | |
| 2009/0265269 A1* | 10/2009 | Stoecker | 705/39 |

* cited by examiner

*Primary Examiner* — Christle I Marshall
(74) *Attorney, Agent, or Firm* — Gold & Rizvi, P.A.; Glenn E. Gold

(57) ABSTRACT

A gift card processing system and method utilizes a clearinghouse to bank, manage, and distribute the gift funds. The card is issued for contributing towards a transaction at a specific issuing merchant. The information (card reference information, value, and issuing merchant) is uploaded to the clearinghouse. The clearinghouse banks the monetary value until the card is used for a transaction. An exchange rate is established for use of the card at an exchange merchant, allowing the cardholder to use the card for a transaction at the exchange merchant. Upon completion of an exchange transaction, the clearinghouse provides payment equaling the amount transacted by the card, including the deducted exchange rate and any respective clearing fee. The balance of the banked card value is provided in payment to the issuing merchant.

17 Claims, 4 Drawing Sheets

MERCHANT GIFT CARD SYSTEM AND METHOD

CROSS-REFERENCE TO RELATED APPLICATION

This Non-Provisional Utility application claims the benefit of U.S. Provisional Patent Application Ser. No. 61/246,798, filed on Sep. 29, 2009, which is incorporated herein in its entirety.

FIELD OF THE INVENTION

The present disclosure generally relates to a merchant gift card use. More particularly, the present disclosure relates to a gift card clearing house method allowing a consumer to use a gift card at a merchant other than the card issued merchant.

BACKGROUND OF THE INVENTION

A gift card is a restricted monetary equivalent that is issued by retailers or banks to be used as an alternative to a non-monetary gift. Highly popular, they rank as the second-most given gift by consumers in the United States (2006) being the most-wanted gift by women, and the third-most wanted by males. Gift cards have become increasingly popular as they relieve the donor of selecting a specific gift. In the United States, about $80 billion were paid for gift cards in 2006. The recipient of the gift card can use it at his or her discretion within the restrictions set by the issuing agency.

A gift card generally resembles a credit card being fabricated of a plastic card that is the size of a credit card. The card is identified by a unique number or code, not usually with an individual name, and thus could be used by anybody. They are managed by a clearing company; utilizing a national or global network for authorization. Some gift cards allow for replenishment of value, thus providing the ability to be used multiple times over the original value.

The gift cards may include a barcode or magnetic strip, which is read by an automated card reading machine. The cards may include a pre-established value, or have a value established at the time of purchase. In the latter case, the cashier enters the desired value and a point of sale system uploads the desired value for the card, which is cross-linked to the card ID, to a gift card database at the clearing company. Gift cards generally differ from stored-value cards (for use with machines such as vending machines, photocopiers, public transportation, and the like), which store the value directly on the card via a magnetic strip, an embedded smart circuit, and/or the like. To provide additional security, gift cards may need to be activated by calling a specific access number or entering information on a specific website.

Gift cards are divided into "open loop" and "closed loop" cards. The former are issued by banks or credit card companies and can be redeemed by different establishments, the latter by a specific store or restaurant and can be only redeemed by the issuing provider. The latter, however, tend to have lesser problems with card value decay and fees. In either case the giver would buy the gift card, and the recipient of the card would use the value of the card at a later transaction. A third form is the "hybrid closed loop" card where the issuer has bundled a number of closed loop cards; an example is a gift card for a specific mall.

Gift cards differ from gift certificates, in that the latter are usually sold as a paper document with an authorized signature by a restaurant, store, or other individual establishment as a voucher for a future service; there is no electronic authorization. A gift certificate may or may not have an expiration date and generally has no administrative fees.

One of the limitations of gift cards is that they are generally limited to a single merchant. Gift givers prefer to give gift cards from a single merchant, expressing a form of thoughtfulness in the selection of the gift. Giving a broader gift card, such as a credit card based value card, is considered similar to cash and could be construed as being less considerate. Although giving a specific merchant gift card is considered more thoughtful than giving a broader gift card such as a credit card based value card, doing so may not be preferred by the gift card recipient. Contrarily, giving a specific merchant gift card limits the use of the card by the receiving party to the specific merchant. A further concern is that specific merchant gift cards are considered unsecured debt by bankruptcy courts, and as such can become valueless when a company files for Chapter 11 reorganization.

Therefore, a gift card system and method that allows a gift giver to purchase a gift card reflecting a single merchant, give the gift card to a receiving party, and wherein the receiving party can use the gift card at a variety of merchants is highly desirable.

SUMMARY OF THE INVENTION

The present disclosure is generally directed to a gift card processing method, the method allowing a consumer to make a transaction using the gift card at an alternate merchant rather than the merchant issuing the gift card.

In some embodiments, the gift card processing method may include:

issuing a merchant issued gift card having a reference and a value titled to be used for a transaction at the issuing merchant;

recording the merchant issued gift card reference and the respective value at a clearing company;

utilizing the merchant issued gift card to complete a transaction at an exchange merchant, applying an exchange rate or discounted value of the gift card towards the transaction, wherein the exchange merchant is not corporately associated with the issuing merchant;

wherein the clearing company transfers a financial sum equivalent to the discounted value of the gift card to the exchange merchant.

Another aspect of the present invention provides the clearing company with a clearing fee. The clearing fee is a service fee paid to the clearing house for maintaining the gift card reference and value information and effecting the various transactions In another aspect, the method provides a means for determining a discounted valuation of the card when used for a transaction at the exchange merchant. The discounted valuation can be pre-established, flexible (changing based upon scenarios), dependent upon the merchant, dependent upon issuing merchant compared to exchange merchant, based upon a bidding, and the like.

Regarding another aspect, an index can be provided to the consumer providing the discounted valuation of the card respective to each of a plurality of merchants.

Yet in another aspect, the clearinghouse provides a balance of the card value to the issuing merchant. The balance of the card value is defined as the original value, minus the clearing fee, minus the discounted valuation.

In still another aspect, the gift card maintains a value should the issuing merchant file for reorganization or dissolution.

In another aspect, the transaction is effected via a communication through a network. The network can be a private network, a telephone network, a wide area network, an Internet, and the like. The communications can be via a secured network, encoded, and/or utilising any other secured communications means.

Continuing with another aspect, the monetary value of the gift card is banked by the clearinghouse. The merchant that sells the gift card to the gifting party transfers the monetary value of the gift card to the clearinghouse.

Yet in another aspect, the merchant issued gift card can be sold to the gifting party by either the issuing merchant or a third a party, such as a supermarket, a book store, a convenience store, and the like.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

The invention will now be described, by way of example, with reference to the accompanying drawings, where like numerals denote like elements and in which.

Figure 1:
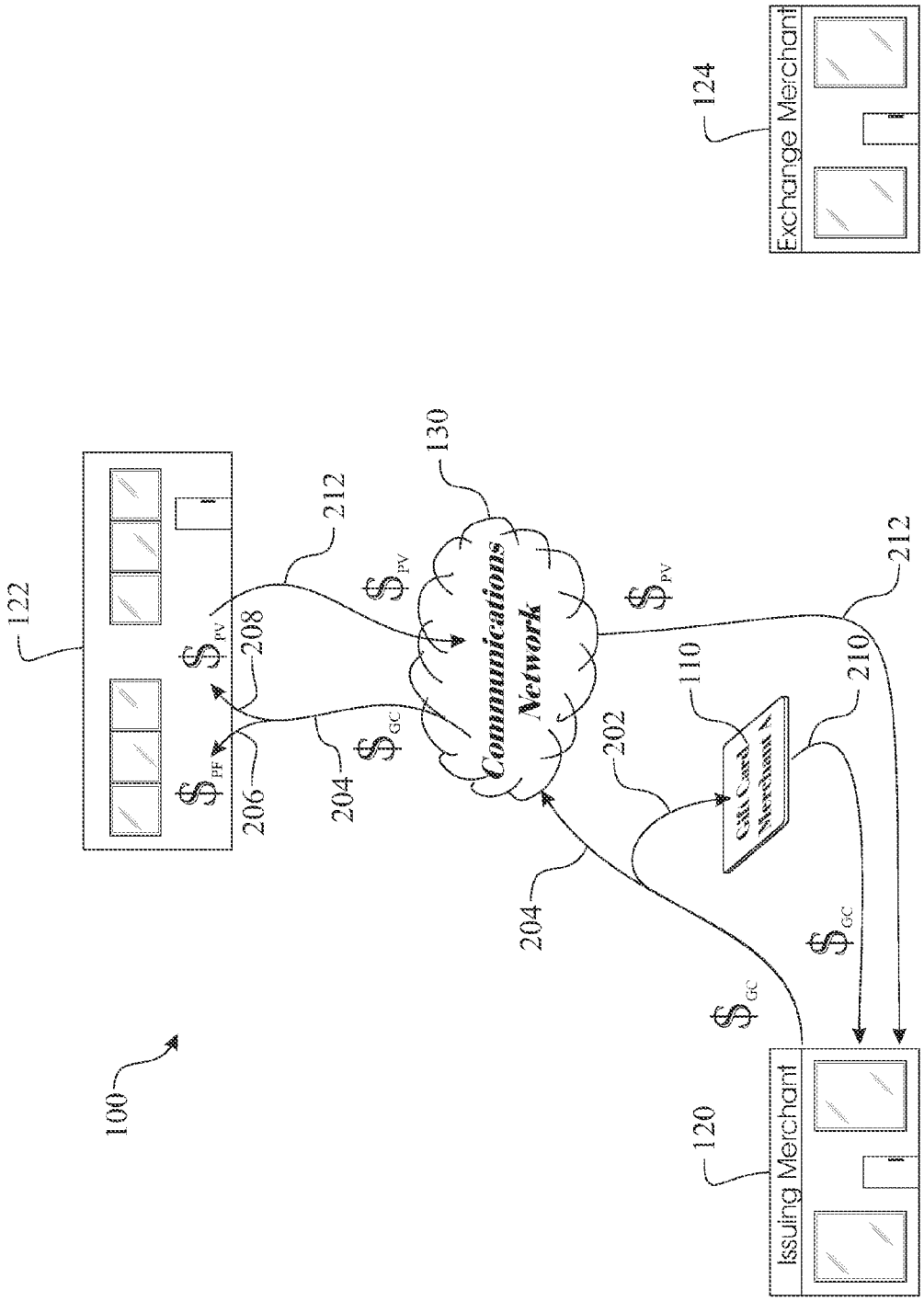
FIG. 1 presents an exemplary block diagram representative of a gift card processing system and method in accordance with a first exemplary embodiment of the present invention.

Repeat use of reference characters in the present specification and drawings is intended to represent the same or analogous features or elements of the invention.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
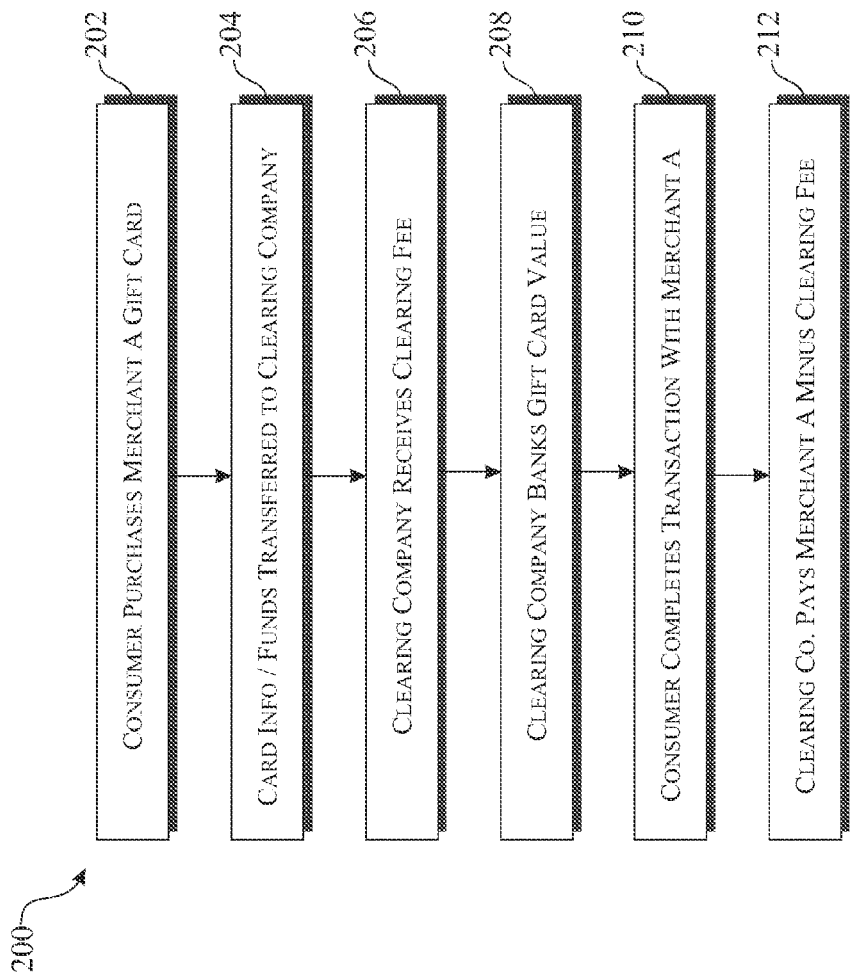
FIG. 2 presents a flow diagram detailing the steps respective to the exemplary block diagram of FIG. 1.

A gift card processing system block diagram 100 is illustrated in FIG. 1 with a supporting gift card processing flow diagram 200 being presented in FIG. 2. The gift giver purchases a merchant issued gift card 110 through any merchant, such as a issuing merchant 120 or a secondary gift card vendor, such as a supermarket, a convenience store, a bookstore, and the like. The purchase of the merchant issued gift card 110 is accomplished in accordance with a gift card purchase step 202. The merchant issued gift card 110 is assigned a unique identifier, such as a 12-16 digit reference number or character set. The merchant issued gift card 110 would include the name or other identifier (such as a logo) of the issuing merchant 120. In addition, the merchant issued gift card 110 could include an identifier (such as a logo) representative of the clearinghouse 122. The unique identifier would be provided in a human readable format as well as an electronically readably format. The human readable format is generally an embossed series of characters. The electronically readable format can be provided via a magnetic strip, an embedded programmable circuit, and the like. The merchant issued gift card 110 can have a pre-established value or have a value established at the time of purchase, wherein the gift card value is referenced as $\$_{GC}$. The value $\$_{GC}$ of the merchant issued gift card 110 can be adjusted in accordance with transactions, lower than and up to the established, pending value of the merchant issued gift card 110 at the time of the transaction. It is further recognized that the pending value $\$_{GC}$ of the merchant issued gift card 110 can be increased by purchasing an additional card value and increasing the amount respectively at the clearinghouse 122. The card reference number, the issuing merchant information, and respective value $\$_{GC}$ are conveyed to a clearinghouse 122 via an information transfer step 204. The information transfer step 204 utilizes a communication network 130 for communicating between various locations, such as the issuing merchant 120 and the clearinghouse 122. The actual monetary amount $\$_{GC}$ is transferred from the issuing merchant 120 (or other actual card retailer) to the clearing house 122 via any physical or electronic funds transferring means known by those skilled in the art. The value $\$_{GC}$ of the merchant issued gift card 110 is apportioned into a processing fee $\$_{PF}$ and a processed value $\$_{PV}$. The processing fee $\$_{PF}$ is a small percentage of the initial card value $\$_{GC}$ provided to the clearinghouse 122 for managing the merchant issued gift card 110 value and effecting any transaction. The clearinghouse 122 received the processing fee $\$_{PF}$ in accordance with a clearing fee payment step 206. The effective value $\$_{PV}$ of the merchant issued gift card 110 is placed into an account for payment of a future transaction in accordance with a gift card valuation banking step 208.

The gift giver presents the merchant issued gift card 110 to a receiving party. The receiving party can utilize the merchant issued gift card 110 to complete a transaction with the issuing merchant 120, being referred to as a transaction completion step 210. The merchant issued gift card 110 can be used for a value of up to the gift card value $\$_{GC}$. For a transaction utilising the maximum value of the merchant issued gift card 110, the issuing merchant 120 receives an amount being the gift card value $\$_{GC}$ subtracting the processing fee $\$_{PF}$, which equals the effective value $\$_{PV}$. Should the transaction be less than the maximum value of the merchant issued gift card 110, the issuing merchant 120 receives the amount of the transaction, subtracting a percentage respective to the processing fee $\$_{PF}$. The clearinghouse 122 to issuing merchant 120 payment process is referred to as a merchant payment step 212.

Figure 3:
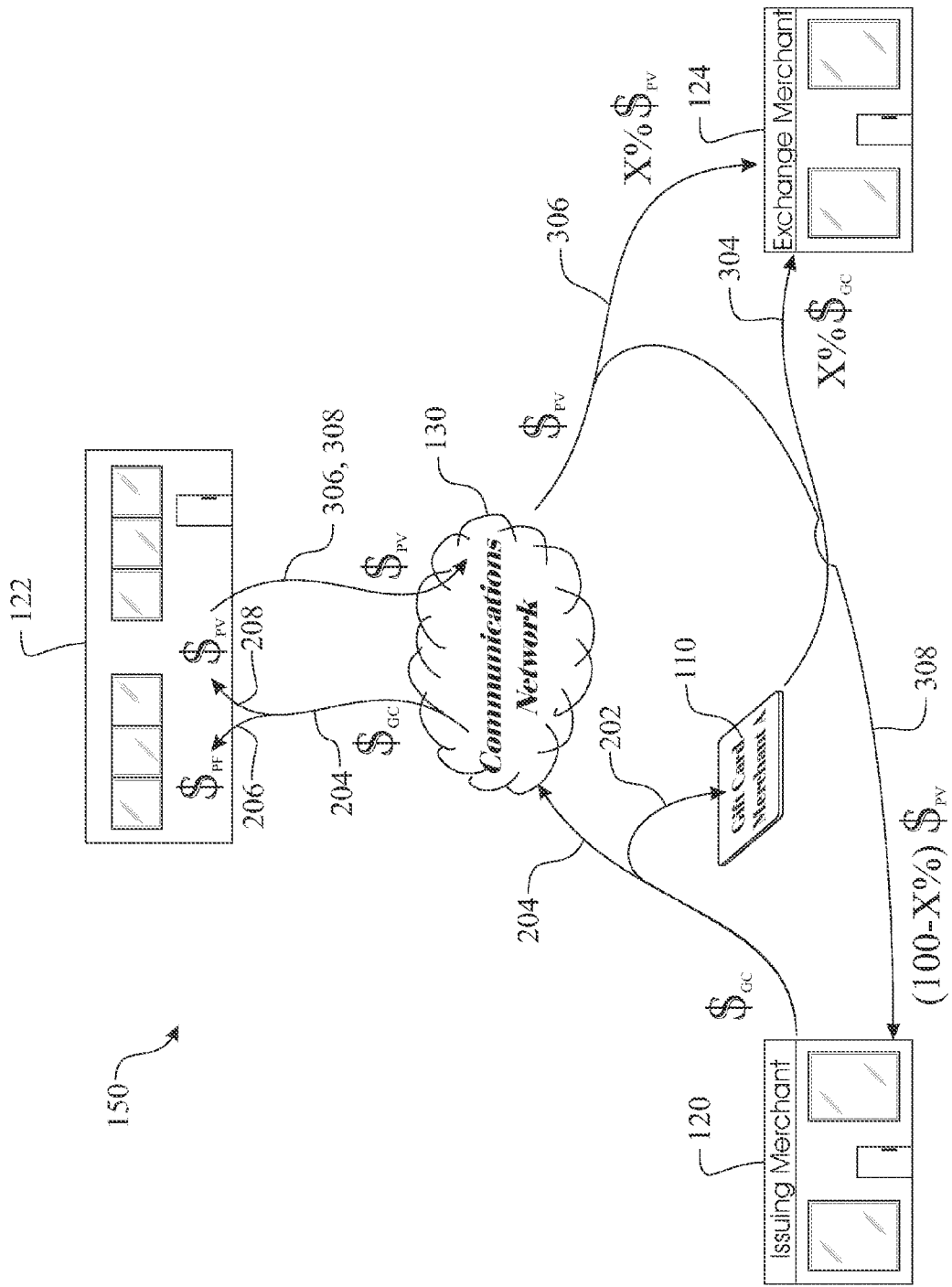
FIG. 3 presents an exemplary block diagram representative of a gift card processing system and method in accordance with a second exemplary embodiment of the present invention.
Figure 4:
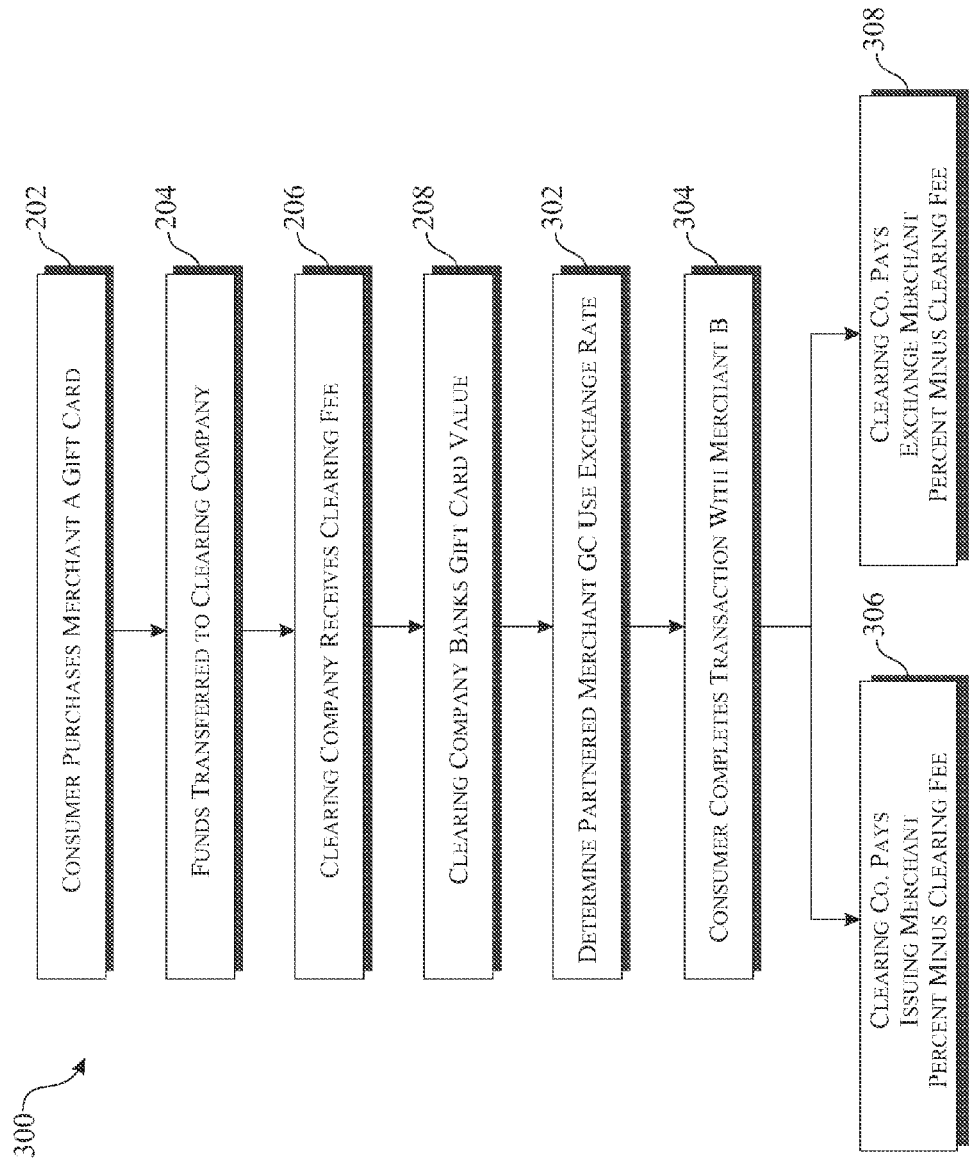
FIG. 4 presents a flow diagram detailing the steps respective to the exemplary block diagram of FIG. 3.

A gift card processing system block diagram 150 is illustrated in FIG. 3 with a supporting gift card processing flow diagram 300 being presented in FIG. 4. The initial steps of a gift card purchase step 202, an information transfer step 204, a clearing fee payment step 206, and a gift card valuation banking step 208 are as previously disclosed in the description describing FIGS. 1 and 2. The method deviates wherein the receiving party completes a transaction with a exchange merchant 124, wherein the exchange merchant 124 has no corporate relation or financial relation with the issuing merchant 120. The receiving party would determine which partner merchants are included in the system and what the respective exchange rate between the merchant issued gift card 110 and the value at the exchange merchant 124. A listing of the merchants can be provided in a list. The user would select the issuing merchant 120 and one or more desired exchange merchants 124. The system will then present an index of exchange merchants 124 and the respective exchange rate x % for each thereof. The card holding consumer then selects the desire exchange merchant in accordance with a determine exchange merchant step 302. If the cardholder desires to make a purchase at the exchange merchant 124, the cardholder can use the merchant issued gift card 110 for at least a portion of the transaction, as referenced by a transaction completion step 306. The transaction completion step 304 provides the exchange rate to the exchange merchant 124, whereby the exchange merchant can determine the adjusted gift card monetary value x %$_{GC}$, wherein x % is representative of the exchange rate. The adjusted gift card monetary value x %$_{GC}$ is deducted from the total amount of the transaction. The exchange merchant 124 communicates with the clearinghouse 122 via the communication network 130, requesting information pertaining to the merchant issued gift card 110. The transaction provides the reference number of the merchant issued gift card 110, and in turn requests validation of the merchant issued gift card 110, the exchange rate x %, and the pending balance $_{GC}$. The exchange merchant 124 continues with the transaction. Upon completion of the transaction, the monetary value x %$_{PV}$ is transferred from the clearinghouse 122 to the exchange merchant 124 via an exchange merchant payment step 306. In parallel, the balance of the banked funds (100−x %)$_{PV}$ reserved for the merchant issued gift card 110 are transferred to the issuing merchant 120 via an issuing merchant payment step 308. Should the issuing merchant 120 become dissolved, the balance of the funds can be transferred to the clearinghouse 122 or the card can be considered open eliminating any exchange reduction. Alternately, the exchange rates can be adjusted and the amended balance of the gift card funds can be transferred to the clearinghouse 122.

Since the effective value $_{PV}$ are held by the clearing house 122, the clearing house 122 can utilise the money for conservative investing, thus providing income to either the clearing house 122 or increasing the effective value $_{PV}$ of the merchant issued gift card 110 for the card holder. The cardholder can access information pertaining to the card, such as the balance available via the communication network 130, such as the Internet.

Gift cards 110, are generally void of an owner's identification. Therefore a form of validation may be implemented, including a Personal Identification Number (PIN), a biometric verification, and the like.

It is understood the actual funding respective to the card can alternately be banked by the issuing merchant 120. The funds would then be disbursed upon the use of the gift card 110. In an alternate embodiment, the gift card 110 can be considered as a universal card (good at any merchant). The exchange rate would be decided by the issuing merchant prior to purchase of the gift card 110. The gift card receiving party would have no control over which stores accept the specific issuing merchant gift card 110 or the exchange rate. This provides flexibility of where to use the card, while providing a fixed exchange rate, thus simplifying the transaction process for the receiving party.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A gift card processing method, comprising:
   organizing a gift card originating and processing system wherein a plurality of merchants agree to act as exchange merchants and accept a gift card to apply against the purchase price of a transaction comprising at least one of service and of merchandise at a point of sale at any of the merchants of the plurality thereof, the gift cart being issued by any one of the merchants of the plurality thereof acting as a gift card issuing merchant in accordance with procedures, established by the gift card originating and processing system and managed by a clearing company, concerning handling of funds from purchase of gift cards by gift card givers, information requirements pertaining to gift card identification, and discounting exchange rates assigned to each merchant of the plurality thereof that determines the exchange value of the gift card for a transaction at a respective exchange merchant which is reduced from the value of the gift card for a transaction at an issuing merchant;
   selling a merchant issued gift card, by an issuing merchant of the plurality thereof, for fulfillment of a purchase of the merchant issued gift card by a gift card giver, the gift card having an issuing merchant reference, a merchant issued gift card reference identifier and a gift card value, wherein said gift card is identified to be used for a transaction at the issuing merchant;
   recording at the clearing company in accordance with said procedures, contemporaneous with the gift card being purchased by the gift card giver from one of the issuing merchant and an authorized agent of the issuing merchant, the issuing merchant reference, the merchant issued gift card identifier, and the respective gift card value;
   contemporaneous with said selling and recording steps and in accordance with said procedures, transferring funds received from the gift card sold, by one of the issuing merchant and authorized agent of the issuing merchant, to the clearing company equal to the value of the gift card purchased by the gift card giver, said funds being placed in an account at the clearing company to be used for payment of at least a portion of a transaction in the future involving the use of the gift card at any of the merchants in the plurality thereof; and
   utilizing, by a gift card receiver, the merchant issued gift card to complete a transaction for at least one of payment of a service and purchase of merchandise at a point of sale at an exchange merchant of the plurality of merchants, applying the discounting exchange rate of the gift card, assigned to the exchange merchant, towards the transaction, wherein the exchange merchant is not corporately associated with the issuing merchant;
   wherein the clearing company transfers a financial sum equivalent to the discounted value of the gift card to the exchange merchant.

2. A gift card processing method as recited in claim 1, the method further comprising a step of:
   providing an index establishing the discounting exchange rate associated with each exchange merchant when the gift card is used for a transaction at the exchange merchant.

3. A gift card processing method as recited in claim 2, the method further comprising a step of transferring a balance of the gift card value to the issuing merchant, wherein the balance of the gift card is calculated as the gift card value reduced by the discounted value of the gift card paid to the exchange merchant.

4. A gift card processing method as recited in claim 2, the method further comprising a step of communicating data information via secured communication network providing data communication between the issuing merchant, the clearing company, and the exchange merchant.

5. A gift card processing method as recited in claim 1, the method further comprising a step of communicating data information via secured communication network providing data communication between the issuing merchant, the clearing company, and the exchange merchant.

6. A gift card processing method as recited in claim 1, the method further comprising steps of:
   deducting a clearing fee from the gift card value, and
   deducting the value of the same clearing fee from the discounted financial sum provided to the exchange merchant after completion of the transaction, wherein the clearing fee is not deducted from the transaction amount.

7. A method for processing a gift card transaction, the method comprising:
   organizing a gift card originating and processing system wherein a plurality of merchants agree to act as exchange merchants and accept a gift card to apply against the purchase price of a transaction comprising at least one of service and of merchandise at a point of sale at any of the merchants of the plurality thereof, the gift cart being issued by any one of the merchants of the plurality thereof acting as a gift card issuing merchant in accordance with procedures, established by the gift card originating and processing system and managed by a clearing company, concerning handling of funds from purchase of gift cards by gift card givers, information requirements pertaining to gift card identification, and discounting exchange rates assigned to each merchant of the plurality thereof that determines the exchange value of the gift card for a transaction at a respective exchange merchant which is reduced from the value of the gift card for a transaction at an issuing merchant;
   selling a merchant issued gift card, by an issuing merchant of the plurality thereof, for fulfillment of a purchase of the merchant issued gift card by a gift card giver, the gift card having an issuing merchant reference, a merchant issued gift card reference identifier and a gift card value, wherein said gift card is identified to be used for a transaction at the issuing merchant;
   receiving, at the clearing company, data pertaining to said merchant issued gift card, the information including the issuing merchant reference, the merchant issued gift card reference identifier and a gift card value;
   storing, at the clearing company in accordance with said procedures, contemporaneous with the gift card being purchased by the gift card giver from one of the issuing merchant and an authorized agent of the issuing merchant, the issuing merchant reference, the merchant issued gift card reference, and the respective value within a centralized clearing database;
   contemporaneous with said selling, receiving and storing steps and in accordance with said procedures, transferring funds received from the gift card sold, by the one of the issuing merchant and authorized agent of the issuing merchant, to the clearing company equal to the value of the gift card purchased by the gift card giver, said funds being placed in an account at the clearing company to be used for payment of at least a portion of a transaction in the future involving the use of the gift card at any of the merchants in the plurality thereof;
   communicating with an exchange merchant to validate the authenticity and gift card value of said merchant issued gift card, wherein the exchange merchant is not corporately associated with the issuing merchant;
   utilizing, by a gift card receiver, the merchant issued gift card to complete a transaction for at least one of payment of a service and purchase of merchandise at a point of sale at an exchange merchant of the plurality of merchants, applying the discounting exchange rate of the gift card, assigned to the exchange merchant, towards the transaction, wherein the exchange merchant is not corporately associated with the issuing merchant;
   receiving a transaction completion request from the exchange merchant; and
   transferring a financial sum equivalent to the discounted value of the gift card to the exchange merchant.

8. A method for processing a gift card transaction as recited in claim 7, the method further comprising a step of:
   providing an index for establishing the discounting exchange rate associated with each exchange merchant when the gift card is used for a transaction at the exchange merchant.

9. A method for processing a gift card transaction as recited in claim 8, the method further comprising a step of transferring a balance of the gift card value to the issuing merchant, wherein the balance of the gift card is calculated as the gift card value reduced by the discounted value of the gift card paid to the exchange merchant.

10. A method for processing a gift card transaction as recited in claim 8, the method further comprising a step of communicating data information via secured communication network providing data communication between the issuing merchant, the clearing company, and the exchange merchant.

11. A method for processing a gift card transaction as recited in claim 7, the method further comprising a step of communicating data information via secured communication network providing data communication between the issuing merchant, the clearing company, and the exchange merchant.

12. A method for processing a gift card transaction as recited in claim 7, the method further comprising steps of:
   deducting a clearing fee from the gift card value, and
   deducting the value of the same clearing fee from the discounted financial sum provided to the exchange merchant after completion of the transaction, wherein the clearing fee is not deducted from the transaction amount.

13. A method for processing a gift card transaction, the method comprising:
   organizing a gift card originating and processing system wherein a plurality of merchants agree to act as merchants and accept a gift card to apply against the purchase price of a transaction comprising at least one of service and of merchandise at a point of sale at any of the merchants of the plurality thereof, the gift cart being issued by any one of the merchants of the plurality thereof acting as a gift card issuing merchant in accordance with procedures, established by the gift card originating and processing system and managed by a clearing company, concerning handling of funds from purchase of gift cards by gift card givers, information requirements pertaining to gift card identification, and discounting exchange rates assigned to each merchant of the plurality thereof that determines the exchange value of the gift card for a transaction at a respective exchange merchant which is reduced from the value of the gift card for a transaction at an issuing merchant;

selling a merchant issued gift card, by an issuing merchant of the plurality thereof, for fulfillment of a purchase of the merchant issued gift card by a gift card giver, the gift card having an issuing merchant reference, a merchant issued gift card reference identifier and a gift card value, wherein said gift card is identified to be used for a transaction at the issuing merchant;

receiving, at the clearing company in accordance with said procedures, contemporaneous with the gift card being purchased by the gift card giver from one of the issuing merchant and an authorized agent of the issuing merchant, data pertaining to the merchant issued gift card, the information including an issuing merchant reference, a merchant issued gift card reference identifier and a gift card value;

storing, at the clearing company in accordance with said procedures, contemporaneous with the gift card being purchased by the gift card giver from the one of the issuing merchant and the authorized agent of the issuing merchant, the issuing merchant reference, the merchant issued gift card reference, and the respective value within a centralized clearing database;

contemporaneous with said selling, receiving and storing steps and in accordance with said procedures, transferring funds received from the gift card sold, by the one of the issuing merchant and authorized agent of the issuing merchant, to the clearing company equal to the value of the gift card purchased by the gift card giver, said funds being placed in an account at the clearing company to be used for payment of at least a portion of a transaction in the future involving the use of the gift card at any of the merchants in the plurality thereof;

communicating with an exchange merchant to validate the authenticity and gift card value of said merchant issued gift card, wherein the exchange merchant is not corporately associated with the issuing merchant;

utilizing, by a gift card receiver, the merchant issued gift card to complete a transaction for at least one of payment of a service and purchase of merchandise at a point of sale at an exchange merchant of the plurality of merchants, applying the discounting exchange rate of the gift card, assigned to the exchange merchant, towards the transaction, wherein the exchange merchant is not corporately associated with the issuing merchant;

completing the transaction for at least one of payment of a service and purchase of merchandise at a point of sale at the exchange merchant with consideration of the discounted rate;

receiving a transaction completion request from the exchange merchant; and transferring a financial sum equivalent to the discounted value of the gift card to the exchange merchant.

14. A method for processing a gift card transaction as recited in claim 13, the method further comprising a step of transferring a balance of the gift card value to the issuing merchant, wherein the balance of the gift card is calculated as the gift card value reduced by the discounted value of the gift card paid to the exchange merchant.

15. A method for processing a gift card transaction as recited in claim 13, the method further comprising a step of encrypting the data and communicating the encrypted data via secured communication network providing data communication between the issuing merchant, the clearing company, and the exchange merchant.

16. A method for processing a gift card transaction as recited in claim 13, the method further comprising steps of:
deducting a clearing fee from the gift card value, and
deducting the value of the same clearing fee from the discounted financial sum provided to the exchange merchant after completion of the transaction, wherein the clearing fee is not deducted from the transaction amount.

17. A method for processing a gift card transaction as recited in claim 13, the method further comprising a step of:
adding to the gift card value by communicating that a transaction was completed for adding more money onto the gift card.

* * * * *